(12) United States Patent
Perlmutter et al.

(10) Patent No.: US 11,323,426 B2
(45) Date of Patent: May 3, 2022

(54) METHOD TO IDENTIFY USERS BEHIND A SHARED VPN TUNNEL

(71) Applicant: CHECK POINT SOFTWARE TECHNOLOGIES LTD., Tel Aviv (IL)

(72) Inventors: Amnon Perlmutter, Givatayim (IL); Lior Drihem, Givat Shmuel (IL); Yair Ziv, Hadera (IL); Jeremy Sinai, Hadera (IL); Tsemach Mizrachi, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 232 days.

(21) Appl. No.: 15/787,781

(22) Filed: Oct. 19, 2017

(65) Prior Publication Data

US 2019/0124059 A1   Apr. 25, 2019

(51) Int. Cl.
*H04L 9/40* (2022.01)
*H04L 29/06* (2006.01)

(52) U.S. Cl.
CPC .......... *H04L 63/08* (2013.01); *H04L 63/0272* (2013.01); *H04L 63/0807* (2013.01); *H04L 63/0815* (2013.01)

(58) Field of Classification Search
CPC ..... H04L 63/08; H04L 67/16; H04L 63/0272; H04L 63/0807; H04L 63/0815; H04L 63/083; H04L 63/0892; H04L 63/105; H04L 67/10; G06F 11/1402
USPC ....................... 726/9, 229; 713/178; 709/225
See application file for complete search history.

(56) References Cited

U.S. PATENT DOCUMENTS

| | | | | |
|---|---|---|---|---|
| 6,609,198 B1* | 8/2003 | Wood | ..................... | G06F 21/41 713/155 |
| 7,779,461 B1* | 8/2010 | Liu | ........................ | H04L 63/20 726/15 |
| 8,443,435 B1* | 5/2013 | Schroeder | ............... | H04L 63/08 726/15 |
| 8,930,529 B1* | 1/2015 | Wang | ..................... | H04L 61/15 709/224 |
| 9,923,897 B2* | 3/2018 | Houston | ................. | H04L 63/10 |
| 10,057,246 B1* | 8/2018 | Drozd | ................... | G06F 21/604 |
| 10,257,167 B1* | 4/2019 | Matthews | ........... | H04L 63/0272 |

(Continued)

FOREIGN PATENT DOCUMENTS

CN       110535746 A   * 12/2019

OTHER PUBLICATIONS

Changhoon Kim, et al., Scalable VPN routing via relaying, Sigmetrics '08: Proceedings of the 2008 ACM Sigmetrics international conference on Measurement and modeling of computer systemsJun. 2008 pp. 61-72.*

*Primary Examiner* — Farid Homayounmehr
*Assistant Examiner* — Suman Debnath
(74) *Attorney, Agent, or Firm* — Mark M. Friedman (57) ABSTRACT

Transparently identifying users using a shared VPN tunnel uses an innovative method to detect a user of a shared VPN tunnel, after authenticating the user, using an assigned userid (that may be a virtual IP). The virtual IP is used as a cookie in each request made by the user. This cookie is an authentication token used by the gateway to detect the user behind a specific request for an Internet resource (such as an http/s request). The cookie is stripped by the gateway so the cookie is not sent to the resource.

14 Claims, 3 Drawing Sheets

(56) References Cited

U.S. PATENT DOCUMENTS

| | | | | |
|---|---|---|---|---|
| 2003/0055990 | A1* | 3/2003 | Cheline | H04L 63/0272 709/229 |
| 2004/0174879 | A1* | 9/2004 | Basso | H04L 12/4641 370/392 |
| 2007/0234061 | A1* | 10/2007 | Teo | G06Q 20/382 713/178 |
| 2008/0049752 | A1* | 2/2008 | Grant | H04L 45/00 370/392 |
| 2009/0122990 | A1* | 5/2009 | Gundavelli | H04L 12/4641 380/278 |
| 2010/0274910 | A1* | 10/2010 | Ghanaie-Sichanie | H04L 63/083 709/229 |
| 2011/0090868 | A1* | 4/2011 | Zhang | H04W 8/12 370/331 |
| 2013/0170502 | A1* | 7/2013 | Chen | H04L 63/0272 370/401 |
| 2013/0185446 | A1* | 7/2013 | Zeng | H04L 29/08 709/228 |
| 2014/0189119 | A1* | 7/2014 | Stuntebeck | H04W 12/0027 709/225 |
| 2015/0089629 | A1* | 3/2015 | Gu | H04L 45/507 726/15 |
| 2015/0244687 | A1* | 8/2015 | Perez | H04L 63/08 726/4 |
| 2016/0006837 | A1* | 1/2016 | Reynolds | H04W 84/18 709/203 |
| 2018/0191701 | A1* | 7/2018 | Kong | H04L 63/0807 |
| 2019/0058706 | A1* | 2/2019 | Feijoo | H04L 63/0815 |
| 2019/0075083 | A1* | 3/2019 | Mayya | H04L 63/029 |
| 2020/0092278 | A1* | 3/2020 | Doloff | H04L 63/08 |

* cited by examiner

METHOD TO IDENTIFY USERS BEHIND A SHARED VPN TUNNEL

FIELD OF THE INVENTION

The present invention generally relates to computer security, and in particular, it concerns identifying users of a virtual private network (VPN).

BACKGROUND OF THE INVENTION

One technique for controlling access (e.g. inspecting, blocking) to Internet resources (for example, web services) is routing all traffic from users on an internal company network to a cloud server that can filter web traffic before allowing users access to resources on the Internet.

When using a virtual private network (VPN) to control access, the VPN can be applied by having a separate VPN tunnel and IP per user (if using a VPN agent on each user machine) or by having a shared VPN tunnel which connects the whole organization (internal, company network) to a VPN server (e.g. a generic routing encapsulation (GRE) VPN tunnel opened by the organizational router).

A problem when using a shared VPN tunnel is that the VPN server cannot identify the user behind a specific connection (at the other end of the tunnel). This is a problem because the VPN server cannot apply rules per user (or user group). In addition, the logs issued by the server cannot indicate which user is related to a specific security incident or violation.

Security Assertion Markup Language (SAML) is an XML-based, open-standard data format for exchanging authentication and authorization data between parties, in particular, between an identity provider and a service provider.

The single most important requirement that SAML addresses is web browser single sign-on (SSO). SSO is common at the intranet level (using cookies, for example) but extending SSO beyond the intranet has been problematic, and has led to the proliferation of non-interoperable proprietary technologies.

The SAML specification defines three roles: the principal (typically a user), the identity provider (IdP), and the service provider (SP). In the use case addressed by SAML, the principal requests a service from the service provider. The service provider requests and obtains an identity assertion from the identity provider. Based on this assertion, the service provider can make an access control decision in other words, it can decide whether to perform some service for the connected principal.

Before delivering the identity assertion to the SP, the IdP may request some information from the principal—such as a user name and password—in order to authenticate the principal, SAML specifies the assertions between the three parties: in particular, the messages that assert identity that are passed from the IdP to the SP. In SAML, one identity provider may provide SAML assertions to many service providers. Similarly, one SP may rely on and trust assertions from many independent IdPs.

SAML does not specify the method of authentication at the identity provider; use may include a username and password, or other form of authentication, including multi-factor authentication. A directory service such as LDAP, RADIUS, or Active Directory that allows users to log in with a user name and password is a typical source of authentication tokens at an identity provider.

SUMMARY

According to the teachings of the present embodiment there is provided a method for identification, the method including the steps of: receiving via a virtual private network (VPN) a first request from a user on a first side of the VPN, the receiving at a second side of the VPN, the first request including a reference to a resource to be accessed by the user. If the first request includes a second token authenticating the user to the resource, then allowing the user access to the resource. Else, if the first request includes user identification (userid) then generating the second token authenticating the user to the resource, generating a second request including the second token, and issuing the second request. Else authenticating the user, the authenticating including receiving user identification (userid) for the user; and registering the user, generating a third request including the userid, and issuing the third request.

According to the teachings of the present embodiment there is provided a system including: a processing system containing one or more processors, the processing system being configured to: receive via a virtual private network (VPN) a first request from a user on a first side of the VPN, the receiving at a second side of the VPN, the first request including a reference to a resource to be accessed by the user. If the first request includes a second token authenticating the user to the resource, then the processing system allows the user access to the resource. Else, if the first request includes user identification (userid) then the processing system generates the second token authenticating the user to the resource, generates a second request including the second token, and issues the second request. Else, the processing system authenticates the user, the authenticating including: receiving user identification (userid) for the user; and registers the user, generates a third request including the userid, and issues the third request.

According to the teachings of the present embodiment there is provided a method for identification, the method including the steps of: sending via a virtual private network (VPN) a first request, send sending from a user on a first side of the VPN, the first request including a reference to a resource to be accessed by the user. If the first request includes a second token authenticating the user to the resource, then accessing the resource by the user. Else, if the first request includes user identification (userid) then receiving the second token authenticating the user to the resource, generating a second request including the second token, and sending the second request. Else authenticating the user, generating a third request including the userid, and sending the third request.

According to the teachings of the present embodiment there is provided a non-transitory computer-readable storage medium having embedded thereon computer-readable code for identification, the computer-readable code including program code for: receiving via a virtual private network (VPN) a first request from a user on a first side of the VPN, the receiving at a second side of the VPN, the first request including a reference to a resource to be accessed by the user. If the first request includes a second token authenticating the user to the resource, then allowing the user access to the resource. Else, if the first request includes user identification (userid) then generating the second token authenticating the user to the resource, generating a second request including the second token, and issuing the second request. Else authenticating the user, the authenticating including receiving user identification (userid) for the user; and registering the user, generating a third request including the userid, and issuing the third request.

According to the teachings of the present embodiment there is provided a computer program that can be loaded onto a server connected through a network to a client computer, so that the server running the computer program constitutes a server in a system according to the current description.

According to the teachings of the present embodiment there is provided a computer program that can be loaded onto a computer connected through a network to a server, so that the computer running the computer program constitutes a client computer in a system according to the current description.

In an optional embodiment, the user is selected from the group consisting of: a person; a person using an application on a client computer; a person using a web browser on a client computer; a person using an application on a client computer deployed on a company intranet; and a software process.

In another optional embodiment, the first request includes a uniform resource locator (URL).

In another optional embodiment, the first request is sent by the person using the application, via an internal company router on the company intranet, via the VPN, to the cloud gateway.

In another optional embodiment, the resource is a website.

In another optional embodiment, the second token authenticating the user to the resource is selected from the group consisting of: a cookie; and a domain identification (ID) cookie.

In another optional embodiment, the issuing is implemented by redirecting a current request to a different resource, wherein the current request is selected from the group including: the first request; the second request; and the third request.

In another optional embodiment, the registering includes associating the userid with an IP address associated with the user.

In another optional embodiment, subsequent to the authenticating the user: assigning a virtual intranet protocol (IP) address to the user and using the virtual IP instead of the userid.

In another optional embodiment, the second token is based on a unique user identification (userid) data for a domain of the resource.

In an optional embodiment, the processing system is a cloud gateway deployed on the Internet;

BRIEF DESCRIPTION OF FIGURES

The embodiment is herein described, by way of example only, with reference to the accompanying drawings, wherein.

ABBREVIATIONS AND DEFINITIONS

For convenience of reference, this section contains a brief list of abbreviations, acronyms, and short definitions used in this document. This section should not be considered limiting. Fuller descriptions can be found below, and in the applicable Standards.

Cookie—also called web cookie, Internet cookie, browser cookie, or simply cookie) is usually an HTTP cookie, a small piece of data sent from a website and stored on a user's computer by the user's web browser while the user is browsing.

GRE: Generic routing encapsulation.
GW: Gateway.
HTTP: Hypertext Transfer Protocol.
ID: Identification.
IdP, IDP, SAML-IdP: SAML identity provider.
IP: Internet protocol.
IT: Information technology.
LDAP: Lightweight Directory Access Protocol.
RADIUS: Remote Authentication Dial-In User Service.
SAML: Security Assertion Markup Language.
SMS: Short message service, or "text message".
SP, SAML-SP: SAML service provider.
SSO: Single sign-on.
URL: Uniform resource locator.
VPN: Virtual private network.
XML: Extensible Markup Language.

Figure 1:
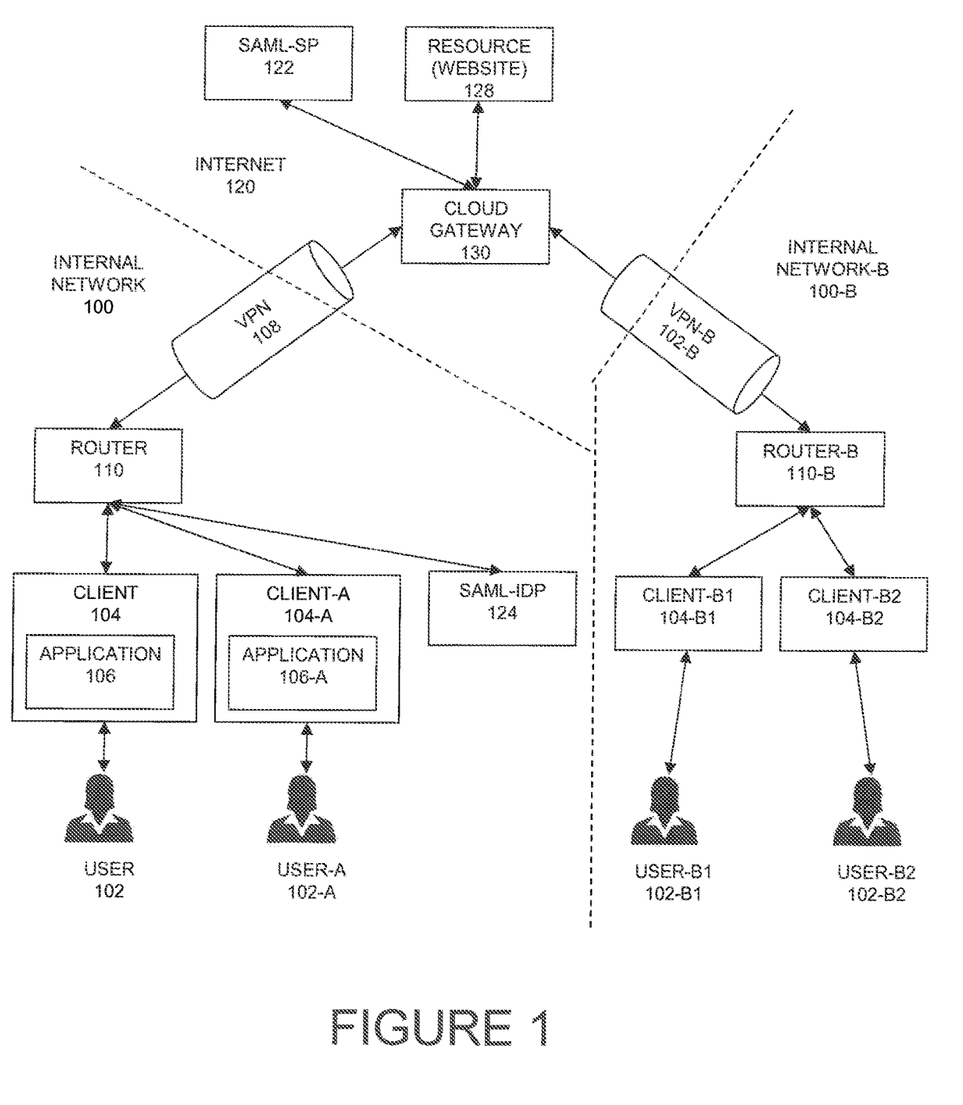
FIG. 1 is a diagram of a network configuration supporting identification of users behind a shared network communication channel.
Figure 2:
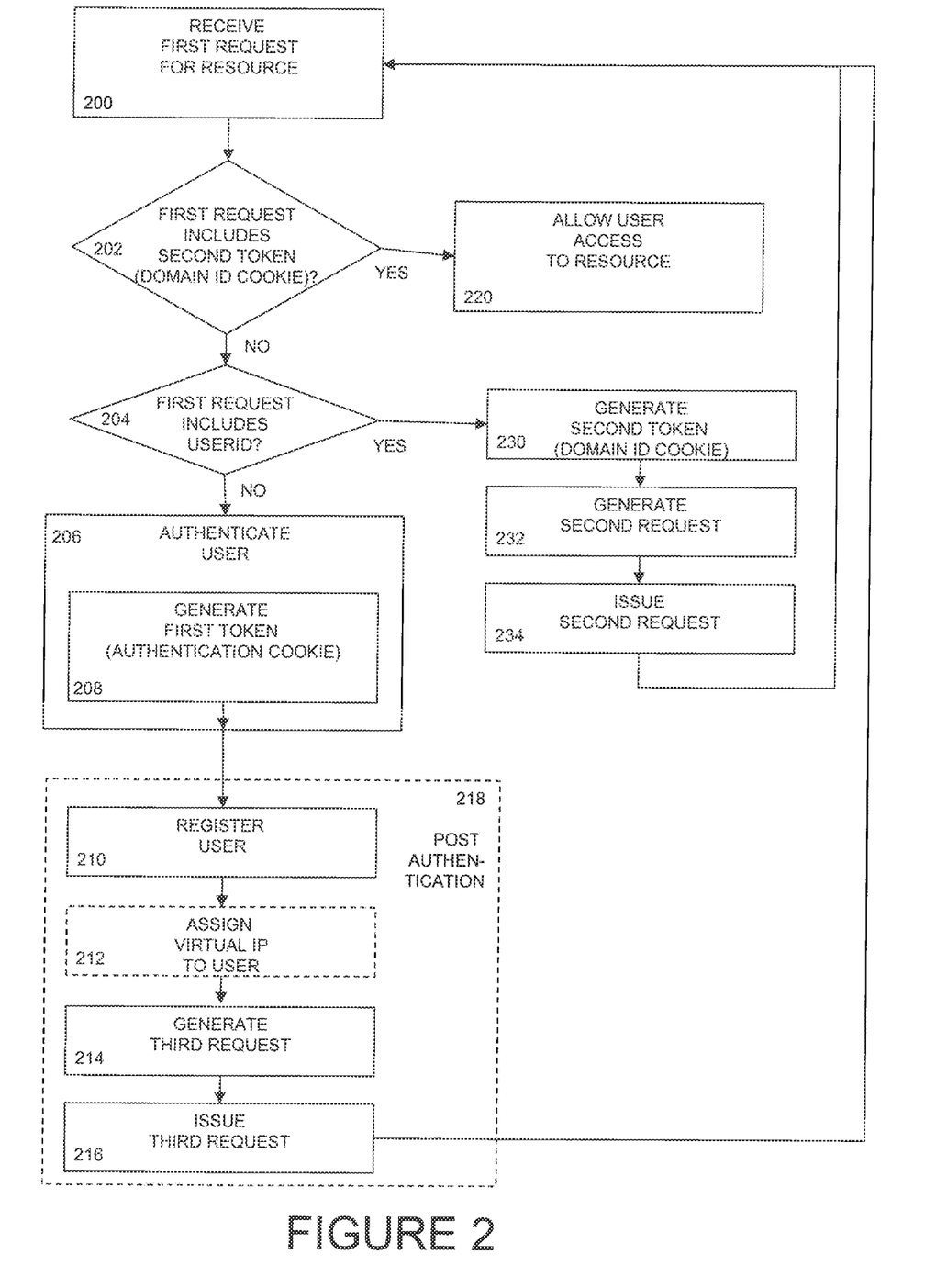
FIG. 2 is a simplified flowchart of a method for identification
Figure 3:
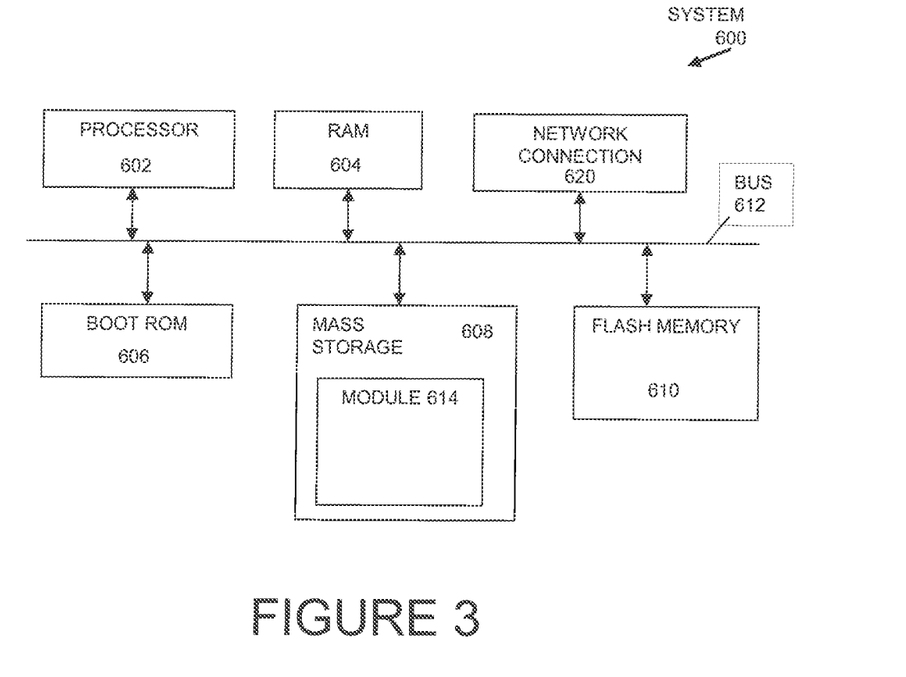
FIG. 3 is a high-level partial block diagram of an exemplary system configured to implement the gateway of the present invention

DETAILED DESCRIPTION FIRST EMBODIMENT—FIGS. 1 TO 3

The principles and operation of the system according to a present embodiment may be better understood with reference to the drawings and the accompanying description. A present invention is a system for identification. The system facilitates identification of individual users behind a shared tunnel, such as a shared VPN tunnel.

A feature of the current embodiment is transparently identifying users using a shared VPN tunnel. When using a separate VPN tunnel per user (with the endpoint VPN client), each user is assigned a respective virtual IP address (virtual IP), and the gateway (VPN server) can detect the user based on the user's virtual IP address. The current embodiment uses an innovative method to detect a user of a shared VPN tunnel, after authenticating the user, using an assigned userid (that may be a virtual IP). The virtual IP is used as a cookie in each request made by the user. This cookie is an authentication token used by the gateway to detect the user behind a specific request for an Internet resource (such as an http/s request). The cookie is stripped by the gateway so the cookie is not sent to the resource.

While portions of the present embodiment may exist in conventional techniques, the synergistic combination described in this document provides an innovative solution for the field. The cyber security provided by the present embodiment is an improvement to the functioning of the computers, networks, and company security themselves.

Referring now to the drawings, FIG. 1 is a diagram of a network configuration supporting identification of users behind a shared network communication channel. One or more users, typically two or more users, a plurality of users, or a multitude of users share a single network communication channel from the users' side of the channel to another side of the channel. Alternatively, the network communication channel can be any communication channel that obscures the individual users. For simplicity in this description, this shared network communication channel will be referred to as a "shared VPN tunnel", "VPN tunnel", or simply "VPN". While the current embodiment is primarily described using a VPN, this description is not limiting, and embodiments can be used for other implementations in which a user's identity is obscured by an intermediate communication link.

An internal network 100 is connected via a VPN 108 to a cloud gateway 130 on an external network, such as Internet 120. On the internet 120 are deployed resources 128. Other and additional nodes on the Internet 120 can include a SAML-SP 122.

On the internal network 100 a router 110 is deployed. One or more clients are deployed on the internal network 100 and connected via the router 110 and VPN 108 to the cloud gateway 130. Exemplary client 104 has a user 102 running an application 106. Similarly, an exemplary client-A 104-A has a user-A 102-A running an application 106-A. The internal network 100 may include other and additional nodes, such as a SAML-IDP 124

Similar to internal network 100, on an internal network-B 100-B a router-B 110-B is deployed. One or more clients are deployed on the internal network-B 100-B and connected via the router-B 110-B and VPN-B 108-B to the cloud gateway 130. Exemplary client-B1 104-B1 has a user-B1 102 running an application 106-B1. Similarly, an exemplary client-B2 104-B2 has a user-B2 102-132 running an application 106-B2. The internal network-B 100-B may include other and additional nodes, not shown.

The Internet 120 can be any network separate from the internal network 100, including but not limited to the Internet, sub-networks, networks other than the internal network 100, a network other than the network on which the client 104 is deployed, or even another machine on the internal network other than the client machine.

The cloud gateway 130 may be one or more devices including one or more processors in one or more locations, implemented physically or virtually, as is know in the current state of the art. The cloud gateway 130 implements gateway functionality, preferably deployed on the "Internet cloud", or "cloud", and can be offered as a cloud service to companies—operating as a gateway for the company's internal network 100. In general, the cloud gateway 130 is a computing device configured for implementing the appropriate modules of the current embodiment. In this description, the cloud gateway 130 is typically referred to for simplicity as the gateway. The gateway 130 may be a server and typically implements a VPN server.

The resources 128 can be a variety of nodes providing a variety of services and information, providing (serving) one or more websites, hosting one or more virtual servers, and in general providing resource(s) to client(s) 104. In particular, for simplicity in this description the resource is a web server providing one or more websites and web pages. References to the (plural) resources 128 may also be in the singular "resource" as appropriate for clarity and simplicity.

For simplicity, the router 110 is used to represent a variety of devices, one or more of which can be deployed between the Internet 120 and the internal network 100, in particular between the gateway 130 and the clients 104. In the context of this description, the router 110 can represent devices including, but not limited to, routers, proxies, transparent proxies, proxy servers, servers, firewalls, gateways, etc. Alternatively, the router 110 can be implemented as a module on the client 104 or in another location on the interne 120 or the internal network 100, as is known in the art. The router 110 has a public IP address that is known on the Internet 120. For example, the router 110 may have address 209.87.209.100 and the router-B 110-B may have address 194.29.39.11.

Internal network 100 represents a location on which the users 102 work, on which the users' corresponding machines (client 104) are deployed. Generally, the internal network 100 is an organization's IT infrastructure, and is referred to as the "organization's network", "network at the organization", and "company intranet". One skilled in the art will realize that for simplicity, the term "internal network" can include a variety of physical implementation and architectures, including but not limited to one or more subnets and additional networks co-located or in physically diverse locations.

The client 104 is generally a computing device running one or more applications such as the exemplary application 106. For simplicity in this description, the exemplary application 106 is generally a web browser (or simply "browser"). Other applications include, but are not limited to email, and SMS. The client is generally a user's computing device. The user 102 can use an application 106 to access a resource 128, or the application 106 can be a process that accesses resources. Each client has an IP address that is unique for the internal network on which the client is deployed. For example, on the internal network 100, the client 104 may have address 192.168.1.10 and the client-A 104-A may have address 192.168.1.11, while on the internal network-B 100-B the client-B1 104-B1 may have address 192.168.1.10 and the client-B2 104-B2 may have address 192.168.1.11.

As can be seen from the current figure, a problem with conventional techniques is that when using a shared VPN tunnel (the VPN 108 and the VPN-B 102-B), the VPN server (gateway 130) cannot identify the user (user 102, user-A 102-A, user-B1 102-B1 or user-B2 102-B2) behind a specific connection (at the other end of the VPN tunnel) because communication from all users on a company network (for example, the internal network 100) appear to the gateway 130 as coming from the same IP address (the address of the router 110). Thus, both the user 102 at 192.168.1.10 and the user-A 102-A at 192.168.1.11 appear to the gateway 130 as coming from the address of the router 110.

As is known in the art, computing devices such as client 104 can be elements such as desktop computers, consoles, laptops, and cell phones referred to as computers, computing devices, and machines.

References to the (single) user 102 may also be in the plural "users", as appropriate for clarity of the discussion, as will be obvious to one skilled in the art. Users may also be referred to in the context of this description as victims or targets. A user is normally a person, using applications on a client computer, such as a person using a web browser on a client computer. In the context of this document, a user can be any entity accessing a resource from one end of a VPN to another end of the VPN, for example, the user may be a process, software process, program, or application on an internal network node. As is common in the art, references to the user 102 may actually refer to devices of the user 102, for example the client 104, or applications being run by the user 102, for example the application 106. One skilled in the art will be aware of the subject of discussion from the context of use of the term "user".

Refer now to FIG. 2, a simplified flowchart of a method for identification. In particular, a method for identifying a user, and identifying each of multiple users, behind a shared VPN tunnel. In step 200, the current embodiment begins with receiving a first request from a user 102, the user being on a first side of the VPN 108. The request is received via the VPN 108, at a second side of the VPN 108. The second side of the VPN is normally a side of the VPN other than the first side of the VPN. The first side is typically the internal network 100, and the second side is typically the Internet 120. The request is typically received by the gateway 130.

The first request includes a reference to a resource 128 to be accessed by the user 102. Optionally, the first request includes a uniform resource locator (URL). The URL can be a reference to a resource, for example a URL of a website. Optionally, the resource is a website.

In step 202, the first request is processed and evaluated by the gateway 130, to determine if the first request includes a second token authenticating the user to the resource. Processing may include decrypting the second token and parsing the resulting data to determine a userid and domain (resource reference).

This second token can be a cookie, and in particular can be a domain identification (ID) cookie (domain ID cookie). The second token can be implemented as encrypted user identification (userid) data for the domain of the resource 128.

User identification, or a userid, is associated with a particular user and can be anything that can distinguish one user from another. Userids can include random sequences, login identifications, username, and a user email address.

From step 202, if the first request includes the second token, the method continues with step 220, else the method continues at step 204.

In step 220, if the first request includes the second token, then the user is allowed access to the resource 128. Access can be given by the gateway 130 stripping the domain ID cookie from the first request and re-issuing the first request to the Internet 120.

In step 204, the first request does not include a second token authenticating the user to the resource. The first request is then processed and evaluated by the gateway 130, to determine if the first request includes a userid. Processing may include decrypting the first request and parsing the resulting data to determine a userid. In a case where the first request is a URL, the URL, can be checked to see if the URL includes a userid. If the first request includes the userid, then the user has previously been authenticated (see below steps 206 to 216) and from step 204 the method continues at step 230, else the method continues at step 206.

In step 230, the user 102 has been authenticated, but the user has not yet been authenticated to the resource in the first request (that is, not authenticated to the domain of the reference to the resource 128). A second token (domain ID cookie) authenticating the user to the resource is generated. In other words, the gateway 130 sets the domain ID cookie.

In step 232, a second request is generated. The second request is based on the first request, includes the reference to the resource 128, and includes the second token.

In step 234, the second request is issued. Issuing a request typically is re-directing the request, for example re-directing the user's web browser. Re-directing can be to another resource, typically to another website, webpage, or port on the network to continue with the next step of subsequent processing (for example, for identifying the user and allowing the user access to the originally requested resource). The issuing can be implemented by redirecting a current request to a different resource or a current request to the same resource but with different content in the subsequent request. A different resource is a resource other than the current resource. For example, in the case of the current resource being a website (the resource 128), issuing the second request can be implemented by redirecting the user's browser from the gateway 130 to the originally requested resource (the website 128). In this embodiment, at different steps, the current request can be the first request, the second request, or the third request. Typically, the subsequent request is the second or third request being handled like a first request.

In this case, the re-direction is to the same resource, but with a different request, specifically with the request now including the second token. In other words, the second request is issued and then is handled like the first request, repeating the steps of the current figure.

In step 206, the user 102 has not yet been authenticated, and is authenticated. Authentication is typically based on the userid. The userid is received by the module performing the authentication. The results of authentication include generating a first token authenticating the user. The first token is typically a cookie, in this case an authentication cookie.

Authentication can be implemented using a variety of known techniques. For example, if Kerberos is used for authentication, the user can be re-directed to a captive portal on the gateway 130. Kerberos authentication is performed, a first token (authentication cookie) is generated at step 208, and the method continues at step 210.

If SAML is used for authentication, the user 102 is re-directed from the gateway 130 to the SAML-SP 122. The SANK-SP 122 begins authentication by re-directing the user 102 (typically actually the user's browser, the application 106, as noted above with regards to the use of the term "user") to a SAML-IDP 124. The SAML-IDP 124 performs identification of the user and authentication of the user (via the user's browser). Then the SAML-IDP 124 re-directs to the SAML-SP 122 to complete the authentication process. The SAML-SP 122 assigns an authentication cookie having the domain of the SAML-SP 122, shown in the current figure as step 208, generating a first token. Alternatively, if a user already has been authenticated, the first request may include the first token (authentication cookie), in which case the SAML-SP 122 does not need to redirect to the SAML-IDP 124.

After the user has been authenticated, the method continues at step 210. For convenience of reference, steps 210 to 216, respectively register user, optionally assign virtual IP to user, generate third request, and issue third request, are shown in the current figure as a group labeled "post authentication" 218.

Whichever method of authentication is used, preferably the subsequent steps (subsequent to authenticate user 206) of "post authentication 218", are performed on the same device as the authentication. For example, if Kerberos is used for authentication, then authentication is typically performed on the gateway 130, and the post authentication 218 is preferably implemented on the gateway 130. Similarly, for example, if SAML is used for authentication, then authentication is typically performed with the SAML-SP 122, and the post authentication 218 is preferably implemented on the SAML-SP 122. However, these previous examples are not limiting, and the post authentication 218 can be performed at a variety of locations on the Internet 120 or internal network 100.

Registering, optionally assigning a virtual IP, and redirecting (issuing the third request) are normally performed subsequent to authenticating the user (generating an authentication cookie), however, authenticating at a minimum only includes getting an authentication cookie. The other subsequent steps (registering, etc.) are not necessarily part of the step of authentication, and can be performed by a module other than the authentication module. For example, when SAML is being used for authentication, the subsequent steps of registering, etc. are typically implemented on the SAML-SP, but are not part of the authentication process.

In step 210, the user 102 has been authenticated, and the user is now registered. Registration is preferably performed on the gateway 130. Registering includes associating the userid with an IP address of the user. In other words, a link is created between an IP address and the userid. Subsequent to registration, the gateway 130 knows that the userid is authenticated. In other words, the gateway 130 knows that authentication is not needed because the userid is part of the request. When the gateway receives a future first request, and the first request includes a userid, the gateway 130 will know that the user is already authenticated (step 204), that authentication (step 206) does not have to be performed, and that the method can continue with processing at step 230 to generate a domain ID cookie.

In step 212, optionally, a virtual IP can be assigned to a user. In this case, the userid is registered with the virtual IP, and the virtual IP can be used instead of the userid. In the current figure, assigning a virtual IP (step 212) is shown after registering the user (step 210), however, the steps can be reversed. Reversing in this case would include assigning a virtual IP (step 212) before registering the user (step 210), and the virtual IP can then be used in place of the userid. That is, the virtual IP is registered instead of the userid, and the virtual IP is subsequently used instead (in place of) of the userid. After optionally assigning a virtual IP (step 212) and registering the user 102 (step 210), the method continues with step 214.

In step 214, a third request is generated. The third request includes the userid.

In step 216, the third request is issued, similar to how the second request is issued as described above in reference to step 234. Issuing the third request redirects to the original resource, with the request now including the userid (redirects the user's browser to the original website, with the URL now including the userid).

From the viewpoint of the user 102, a method for identification begins with sending via a virtual private network (VPN 108) a first request. The sending is typically from the user 102 using the application 106 on the client 104. The client computer 104 is deployed on a company intranet (the internee network 100), on a first side of the VPN 108 to the cloud gateway 130 on the second side of the VPN 108.

As described above, the first request includes a reference to a resource to be accessed by the user. If the first request includes a second token authenticating the user to the resource, then the resource is accessed by the user.

As described above, references to the user 102 may actually refer to devices of the user, for example the client 104, or applications being run by the user 102, for example the application 106. For example, in the current embodiment, the resource being accessed by the user 102 may more specifically be the resource being accessed by the client 104 or the application 106.

If the first request does not include a second token, but does include user identification (userid) then the user 102 (more specifically the client 104 and/or the application 106) receives a second token authenticating the user to the resource. A second request is generated by the user, the second request including the second token. The user sends the second request (redirecting request, now including domain ID cookie).

If the first request does not include user identification, then the user 102 needs to be authenticated. Authenticating the user 102 includes receiving a first token authenticating the user (authentication cookie). A third request is generated, the third request including the userid. Then the third request is sent (typically redirecting to the original website with the URL now including the userid).

FIG. 3 is a high-level partial block diagram of an exemplary system 600 configured to implement the gateway 130 of the present invention. System (processing system) 600 includes a processor 602 (one or more) and four exemplary memory devices: a random access memory (RAM) 604, a boot read only memory (ROM) 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the identification methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method comprising:
    (a) receiving, by a gateway, via a shared virtual private network (VPN) a first request for access to a resource not connected to said shared VPN, said first request being from a user on a first side of said shared VPN, said gateway being at a second side of said shared VPN, and said first request including a reference to said resource to be accessed by said user;

(b) evaluating, by said gateway, said first request to determine whether said first request includes a unique user identification (userid), said userid authenticating said user to said gateway, and when said first request lacks said userid, said gateway:
  (i) generating said userid authenticating said user,
  (ii) registering said user, said registering including associating said user with said userid thereby identifying said user to said gateway, and
  (iii) sending said first request, further including said userid; and (c) evaluating, by said gateway, said first request to determine whether said first request includes a second token, said second token authenticating said user to said resource and said second token based on userid data for a domain of said resource, and when said first request lacks said second token, said gateway:
  (i) generating said second token authenticating said user to said resource, and
  (ii) issuing said first request further including said second token.

2. The method of claim 1 additionally comprising:
evaluating said first request to determine whether said first request includes said second token, and it said first request includes said second token then allowing said user access to said resource.

3. The method of claim 1 wherein said user is selected from the group consisting of:
(a) a person;
(b) a person using an application on a client computer;
(c) a person using a web browser on a client computer; and
(d) a software process.

4. The method of claim 1 wherein said first request includes a uniform resource locator (URL).

5. The method of claim 1 wherein said resource is a website.

6. The method of claim 1 wherein said userid authenticates said user not to the domain of the reference to the resource.

7. The method of claim 1 wherein said issuing is implemented by redirecting said first request.

8. The method of claim 1 wherein said registering includes generating a virtual internet protocol (VIP) address and associating said userid with said VIP address.

9. The method of claim 1 wherein said second token is selected from the group consisting of:
(a) a cookie; and
(b) a domain identification (ID) cookie.

10. A system comprising: a processing system containing one or more processors, said processing system being configured to:
(a) receive via a shared virtual private network (VPN) a first request for access to a resource not connected to said shared VPN,
said first request being from a user on a first side of said shared VPN,
said processing system being at a second side of said shared VPN, and
said first request including a reference to said resource to be accessed by said user;

(b) evaluate said first request to determine whether said first request includes a unique user identification (userid), said userid authenticating said user, and when said first request lacks said userid:
  (i) generate said userid authenticating said user,
  (ii) register said user including associating said user with said userid thereby identifying said user to the processing system based on said userid, and
  (iii) send said first request further including said userid (c) evaluate said first request to determine whether said first request includes a second token, said second token authenticating said user to said resource, said second token based on userid data for a domain of said resource, and when said first request lacks said second token:
  (i) generate said second token authenticating said user to said resource, and
  (ii) issue said first request further including said second token, and when said first request includes said second token then allowing said user access to said resource.

11. The system of claim 10 wherein:
(a) said processing system is a cloud gateway deployed on the Internet;
(b) said user is a person using an application on a client computer deployed on a company intranet; and
(c) said first request is sent by said person using said application, via an internal company router on said company intranet, via said shared VPN, to said cloud gateway.

12. The system of claim 10 wherein:
(a) said first request includes a uniform resource locator (URL);
(b) said resource is a website;
(c) said second token authenticating said user to said resource is selected from the group consisting of:
  (i) a cookie; and
  (ii) a domain identification (ID) cookie; and
(d) said second token is based on a unique user identification (userid) data for a domain of said resource.

13. A method comprising:
(a) sending, to a gateway, via a shared virtual private network (VPN) a first request for access to a resource not connected to said shared VPN,
said first request being from a user on a first side of said shared VPN,
said gateway being at a second side of said shared VPN, and
said first request including a reference to the resource to be accessed by said user;

(b) evaluating, by said gateway, said first request to determine whether said first request includes a unique user identification (userid), said userid authenticating said user, and when said first request lacks said userid, said gateway:
  (i) generating said userid authenticating said user,
  (ii) registering said user, said registering including associating said user with said userid thereby identifying said user to said gateway, and
  (iii) sending said first request further including said userid, (c) evaluating, by said gateway, said first request to determine whether said first request includes a second token, said second token authenticating said user to said resource, said second token based on userid data for a domain of said resource, and when said first request lacks said second token:

(i) generating said second token authenticating said user to said resource, and
(ii) issuing said first request further including said second token, and when said first request includes said second token then allowing said user access to said resource.

14. The method of claim 13 wherein:
(a) said user is selected from the group consisting of:
   (i) a person;
   (ii) a person using an application on a client computer;
   (iii) a person using a web browser on a client computer; and
   (iv) a software process;
(b) said first request includes a uniform resource locator (URL);
(c) said resource is a website;
(d) said second token authenticating said user to said resource is selected from the group consisting of:
   (i) a cookie; and
   (ii) a domain identification (ID) cookie;
(e) said issuing is implemented by redirecting said first request;
(f) said registering includes associating said userid with an IP address associated with said user,
(g) subsequent to said authenticating said user: assigning a virtual internet protocol (IP) address to said user and using said virtual IP instead of said userid; and
(h) said second token is based on a unique user identification (userid) data for a domain of said resource.

* * * * *